Jan. 26, 1960 C. D. NITCHIE ET AL 2,922,364
FLEXOGRAPHIC INK FOUNTAINS
Filed Aug. 8, 1957 3 Sheets-Sheet 1
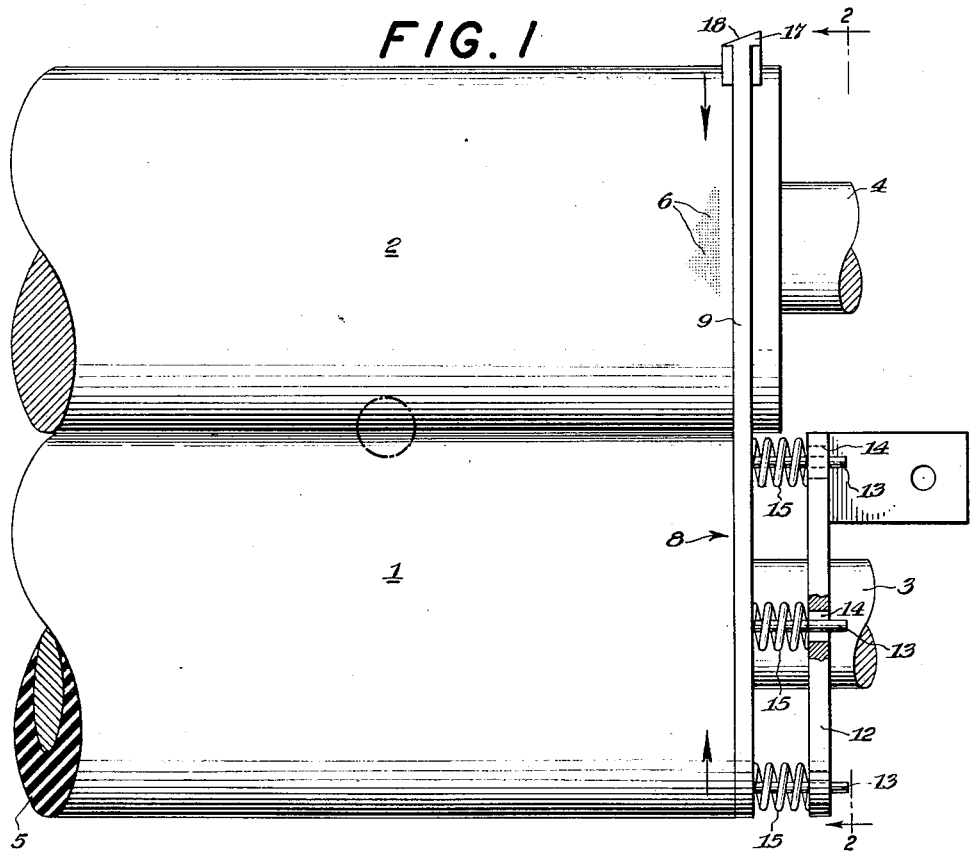
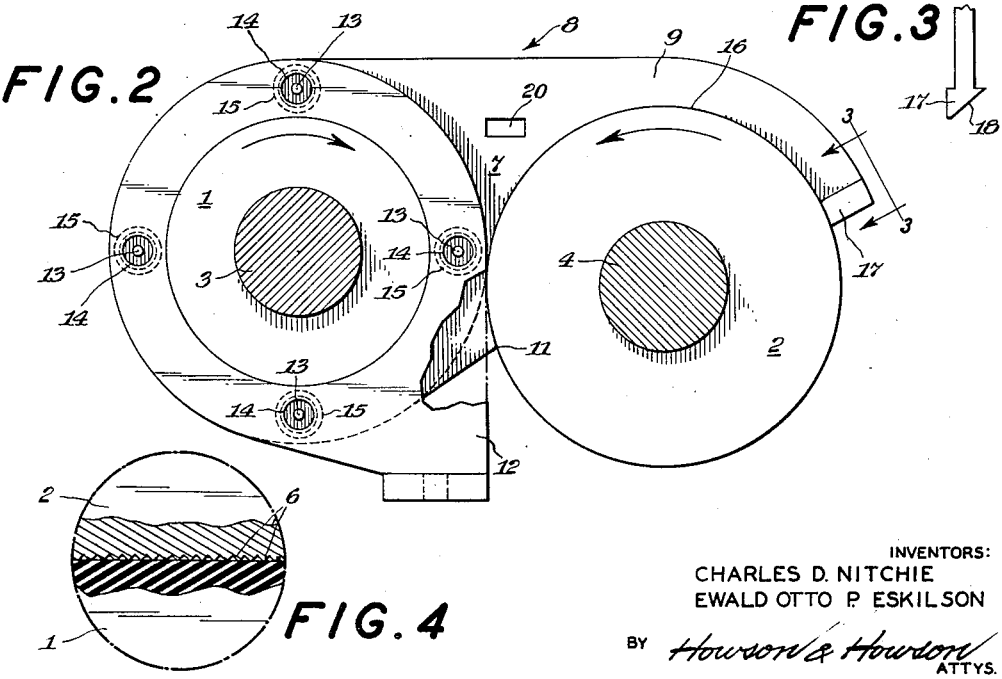
INVENTORS:
CHARLES D. NITCHIE
EWALD OTTO P. ESKILSON
BY Howson & Howson
ATTYS.

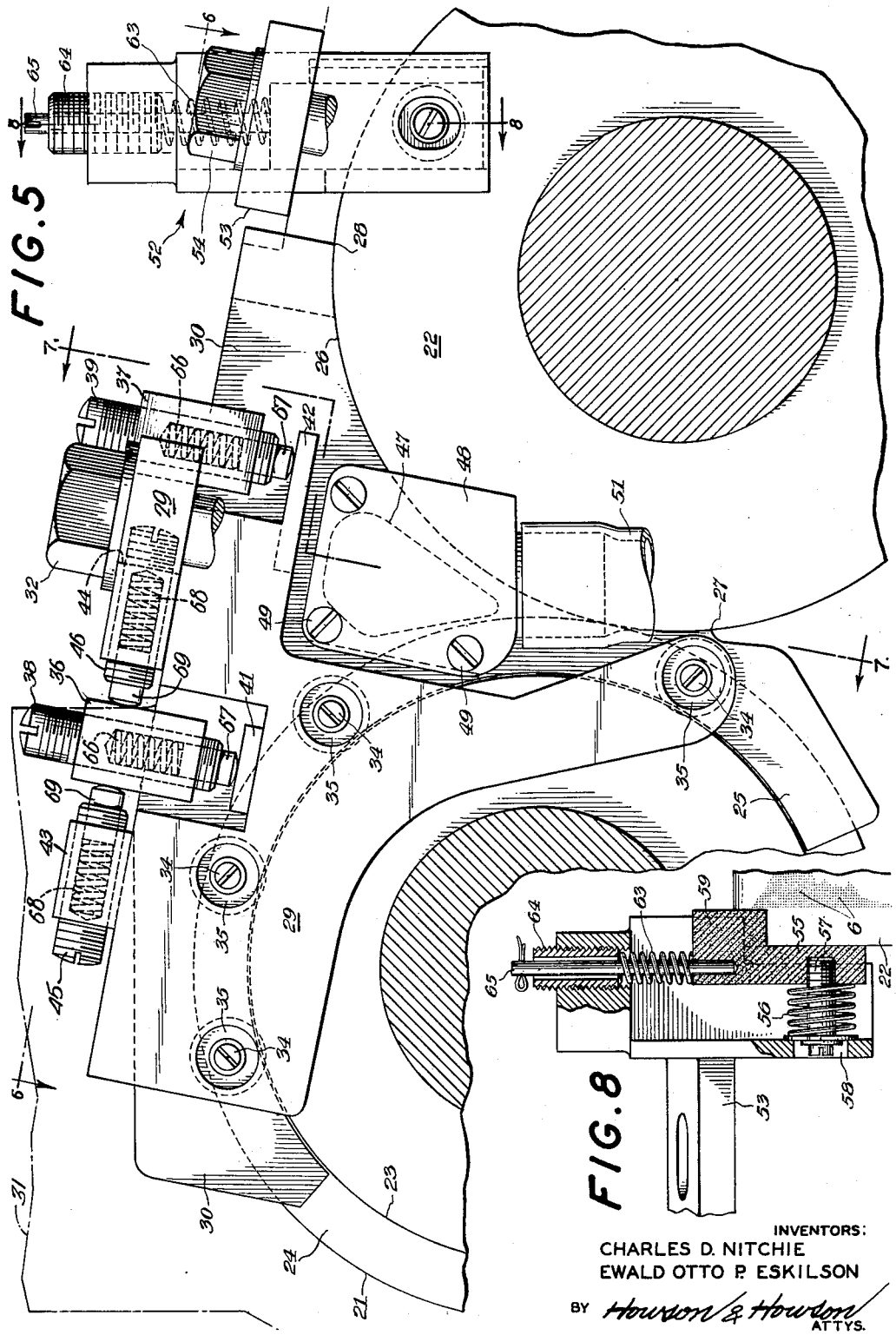

Jan. 26, 1960

C. D. NITCHIE ET AL 2,922,364

FLEXOGRAPHIC INK FOUNTAINS

Filed Aug. 8, 1957

INVENTORS:
CHARLES D. NITCHIE
EWALD OTTO P. ESKILSON

BY Howson & Howson
ATTYS.

United States Patent Office 2,922,364
Patented Jan. 26, 1960

2,922,364

FLEXOGRAPHIC INK FOUNTAINS

Charles D. Nitchie, Towson, Md., and Ewald Otto P. Eskilson, Philadelphia, Pa., assignors to Samuel M. Langston Co., Camden, N.J., a corporation of New Jersey Application August 8, 1957, Serial No. 677,031

10 Claims. (Cl. 101—364)

This invention relates to flexographic ink fountains for printing machines.

In fountains of this type, wherein the ink reservoir is formed in the valley between contacting rolls, a primary problem resides in providing effective dams for the ends of the reservoir. This problem becomes acute when relatively thin flexographic or aniline inks are employed. A principal object of the invention is to provide an end dam structure for the reservoirs of fountains of this type operating on a novel principle which affords an exceptionally high efficiency in the ink retaining function.

The invention will be more readily understood by reference to the attached drawings, wherein:

Fig. 1 is a fragmentary top plan view of a fountain including an end dam made in accordance with the principle of the invention;

Fig. 2 is a sectional view on the line 2—2, Fig. 1;

Fig. 3 is a fragmentary top view from the line 3—3, Fig. 2;

Fig. 4 is a fragmentary view of the nip of the fountain rolls in the area indicated by the broken line circle in Fig. 1 showing the character of the roll surfaces.

Fig. 5 is an end elevational view partly in section of a pair of fountain rolls showing a modified form of dam;

Fig. 8 is a sectional view on the line 8—8, Fig. 5.

Figure 6:
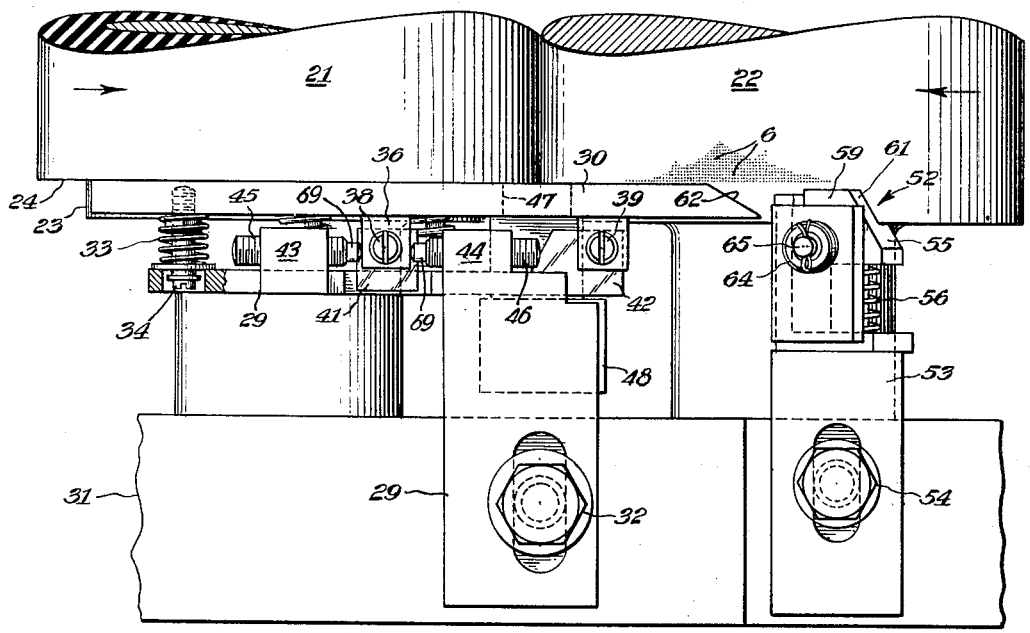
Fig. 6 is a fragmentary top plan view of the roll ends and dam shown in Fig. 5, as viewed from the line 6—6, in the latter figure.
Figure 7:
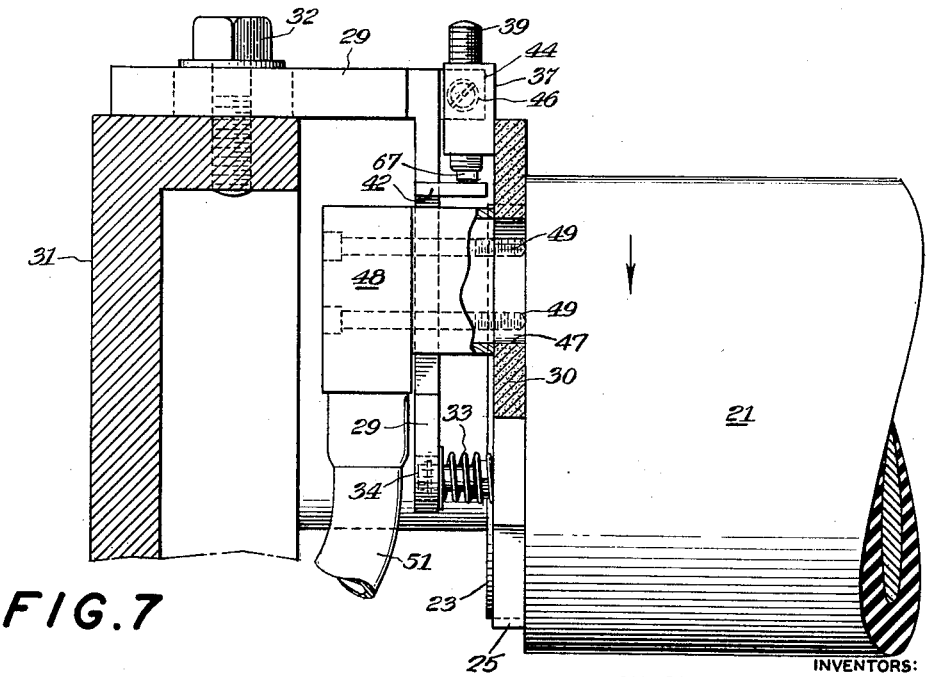
Fig. 7 is a sectional view on the line 7—7, Fig. 5.

The principle of the invention is well illustrated in the simple embodiment shown in Figs. 1 to 4 inclusive of the drawings. The fountain comprises contacting rolls 1 and 2, the roll shafts being indicated at 3 and 4. The roll 1 is slightly shorter in axial length than the roll 2 and has a rubber or like resilient surface as indicated at 5; and the roll 2 is preferably of metal and has in its surface small pits or recesses 6, see Fig. 4, which act in known manner in conjunction with the smooth resilient surface of roll 1 to form on the latter a film of ink of uniform thickness for transfer to the printing roll, not shown. The ink is contained in the V-shaped space 7 between the rolls and is confined to this space by the dams 8, one at each end, which form the subject of the present invention.

The dams 8 are allochiral. Each comprises a plate 9 one end of which seats flatly against the proximate end of the roll 1 and the other end of which extends over and in edgewise engagement with the peripheral surface of the roll 2. This edgewise contact of the plate extends continuously from a point 11 below the theoretical line of contact between the rolls to a point on the roll 2 above the level of the ink in the reservoir, and, in the present instance, extends beyond the top of the roll and embraces somewhat less than 180° of the roll circumference. The plate may be made of any suitable material such, for example, as Micarta or like fabric reinforced plastic material.

The plate is held in place by means of a bracket 12 attached to the frame (not shown) of the machine, said bracket paralleling and being spaced axially from the end of roll 1. Pins 13 project from the outer face of plate 9 through apertures 14 in the bracket and act as retainers for springs 15, said springs being confined under compression between the plate and the bracket and resiliently pressing the plate against the end of roll 1. The apertures 14 are larger in diameter than the pins 13 so that the plate 9 has freedom for self-adjustment under action of the springs 15 against the face of the roll 1 and the periphery of roll 2. The direction of rotation of the rolls is indicated by the arrows in Fig. 2, and the roll 1 exerts a continuous frictional force tending to rotate the plate 9 clockwise as viewed in Fig. 2 which has the effect of pressing the arcuate edge 16 of the plate against the periphery of roll 2.

The end of the plate 9 which extends over the roll 2 is preferably provided with a deflector 17 having an inwardly inclined surface 18 which acts to deflect the edge portions of the residual ink film adhering to roll 2 inwardly toward the center of the roll. The deflector is formed so that the outer end of surface 18 lies beyond the inner surface of the plate 9 and the surface 18 thereby tends continuously to prevent spreading of the ink beyond the active transfer or work area of the roll.

Each of the plates 8 may be provided with a port 20 by way of which a continuous circulation of ink through the reservoir may be maintained, such circulation being of primary importance when using flexographic or like inks of rapid drying characteristics.

The overall effect of the structure described above is to create a highly effective sealed dam for the ends of the ink reservoir. The device, which provides for contact between the dam plate and the axial end surface of one roll, and between the plate and the peripheral surface of the other roll, effectively eliminates the critically precise nature of the prior dams which contacted the end faces of both rolls and which were affected adversely by even minor differences in axial length of the rolls or by differential expansion or contraction thereof. The device effectively eliminates all problems arising from changes in nip geometry arising from variations in the composition of the resilient roll facing.

Figs. 5 to 8 illustrate a refined dam structure involving the same functional principle. In this embodiment the fountain rolls, corresponding respectively to the rolls 1 and 2, are indicated by the reference numerals 21 and 22. The roll 21 has reduced axial extensions at the ends, one of which is shown at 23. The sealing plate 30 in this instance seats flatly against the end surface 24 of roll 21 which extends radially outward from the periphery of the extension 23 and the plate has an arcuate lower edge 25 having clearance with the peripheral surface of the said extension. The other end of the plate has an arcuate edge 26 which conforms to and contacts the peripheral surface of the roll 22, this edge 26 extending from a point 27 on roll 22 below the theoretical line of contact between the rolls to a point 28 at the top of the roll.

The plate 30 is held resiliently against the face 24 of roll 21 through the medium of a bracket 29 attached to the frame 31 of the machine by a screw 32 and by springs 33 confined under compression between the bracket and the plate and secured by pins 34 which project from the plate through relatively large apertures 35 in the bracket. In this instance the plate 30 is provided with a pair of bosses 36 and 37 in which are threaded screws 38 and 39. Each of the screws is recessed at its lower end for reception of a spring 66 and plunger 67, and the plungers seat respectively against lugs 41 and 42 on the bracket 29, see Fig. 7. The springs thereby act to counterbalance the weight of the plate 30 so that it may assume the position in which it is shown in Fig. 5 with the edge 26 in light but firm contact with the surface of roll 22.

The bracket 29 comprises also bosses 43 and 44 on opposite sides respectively of plate boss 36. Threaded into the bosses 43 and 44 are set screws 45 and 46 which are recessed at their inner ends for reception of springs 68 and plungers 69, corresponding to the springs 66 and plungers 67 of screws 38 and 39 described above. The plungers 69 of screws 45 and 46 are pressed by the springs 68 against the opposite sides of the boss 36 and resiliently confine the plate 30 in its own plane on a line normal to the axes of screws 38 and 39. In effect, the screws 38, 39, 45 and 46, with their respective springs and plungers, and the springs 33, provide a flexible or floating mount for the plate 30 whereby the plate may be adjusted to and is held in the desired operative position against the end surface 24 of roll 21 and the peripheral surface of roll 22 with freedom for self-adjustment to the said surfaces. The device is self compensating for wear.

In this embodiment also means is provided in the plates 30 for circulating ink through the reservoir. This means comprises ports 47 in the plates, an elbow fitting 48 attached to the outer side of the plate over the hole by screws 49, and a duct 51 connected to the fitting and to a source of ink supply.

As shown in Fig. 6, the end of the plate 30 which overlies roll 22 is beveled so as to deflect residual ink at the edges of the roll inwardly into the work area. Mounted ahead of the end of the plate with reference to direction of roll rotation is a deflector 52 which extends to the extreme end edge of the roll and which functions to the same end. This deflector is mounted on a bracket 53 attached to frame 31 by screw 54 and comprises a shoe 55 which may be of the same material as the plate 30 and which is pressed against the end face of the roll by a spring 56, see Fig. 8, confined between the bracket and the shoe and retained by a pin 57 extending from the shoe into an enlarged aperture 58 in the bracket. The shoe has an upper part 59 overlying and fitted to the peripheral edge portion of the roll 22 and has a beveled edge 61 which functions to deflect residual ink from the extreme edge of the peripheral surface inwardly to the area embraced by the beveled end 62 of the plate 30. The overhang 59 is held resiliently in contact with the surface of the roll by a spring 63 which is confined under compression between the upper surface of the shoe 55 and a bushing 64 threaded into the bracket 53, the spring being retained in position by a pin 65 which extends upwardly from the shoe through the bushing.

This embodiment of the invention functions on essentially the same novel principle as the embodiment of Figs. 1 to 3 described above. It will be apparent that there may be other modification without departure from the said principle; and that such modification comprehends a reversal of the dam members to abut the end surface of the roll 2 or 22, as the case may be, and the peripheral surface of the roll 1 or 21.

We claim:

1. In an ink fountain of the type described comprising a pair of contacting fountain rolls forming at the tops thereof and between them the bottom and opposite side walls of an ink reservoir and means at the roll ends providing end walls for the reservoir, one at least of said end wall means comprising a dam plate having one face seated flatly against an end surface of one of said rolls in resilient sealing engagement therewith and having contact only with said surface, and having an arcuate edge in sealing contact with the peripheral surface of the other of the rolls, the contact of the plate with the latter roll being confined to said edge.

2. An ink fountain according to claim 1 including resilient means for supporting the plate in operative position against the rolls and constituting the sole means for supporting the plate.

3. An ink fountain according to claim 2 including means for adjusting the resilient means to regulate the bearing pressure of the plate against the roll surfaces.

4. An ink fountain according to claim 2 wherein the resilient means includes at least one spring for counterbalancing the weight of the plate.

5. An ink fountain according to claim 4 including adjustable means for regulating the counterbalancing pressure of the spring.

6. An ink fountain according to claim 1 wherein the rolls rotate in reverse directions and toward each other at the top so that the roll against the end surface of which the said plate is seated tends frictionally to urge the arcuate edge of the plate against the periphery of the other roll.

7. An ink fountain according to claim 1 wherein contact of the arcuate edge of the plate with the periphery of the second roll extends upwardly from a point on said roll below the position wherein the rolls contact each other.

8. In an ink fountain of the type described comprising a pair of contacting fountain rolls forming at the tops thereof and between them the bottom and opposite side walls of an ink reservoir and means at the roll ends providing end walls for the reservoir, said end wall means comprising a flat end surface on one of said rolls defining a plane normal to the axis of the roll and intersecting the peripheral surface of the other roll, and a dam plate seated flatly against said end surface and having an arcuate edge in sealing contact with the said peripheral surface of the other roll, and means for forcibly seating the plate against said end surface.

9. An ink fountain according to claim 8 wherein the said seating means includes resilient means for retaining the plate to its seat against the end surface.

10. An ink fountain according to claim 6 including deflector means contacting the said peripheral surface at the outer end of said arcuate sealing edge for deflecting ink from the edge areas of said surface inwardly toward the center of the roll.

References Cited in the file of this patent

UNITED STATES PATENTS

| | | |
|---|---|---|
| 1,993,284 | Roehm | Mar. 5, 1935 |
| 2,178,070 | Daniels | Oct. 31, 1939 |
| 2,218,945 | Andersson | Oct. 22, 1940 |
| 2,585,598 | Taylor | Feb. 12, 1952 |

UNITED STATES PATENT OFFICE

CERTIFICATE OF CORRECTION

Patent No. 2,922,364                      January 26, 1960

Charles D. Nitchie et al.

It is hereby certified that error appears in the printed specification of the above numbered patent requiring correction and that the said Letters Patent should read as corrected below.

Column 4, line 31, beginning with "7. An ink fountain" strike out all to and including "other." in line 35, comprising claim 7; same column for the claims now appearing as "8", "9" and "10" read -- 7, 8 and 9 --; same column 4, line 49, for the claim reference numeral "8" read -- 7 --; in the heading to the printed specification, line 8, for "10 Claims." read -- 9 Claims. --.

Signed and sealed this 30th day of August 1960.

(SEAL)
Attest:

ERNEST W. SWIDER
Attesting Officer

ROBERT C. WATSON
Commissioner of Patents